United States Patent [19]

Yano et al.

[11] Patent Number: 5,189,430
[45] Date of Patent: Feb. 23, 1993

[54] NAVIGATION SYSTEM FOR MOVABLE BODY

[75] Inventors: Haruto Yano; Yoshiaki Hirasa; Toshimichi Tokunaga, all of Hiroshima; Katsuro Hayami, Hyogo; Norihiro Naito, Hyogo; Teruki Akamatsu, Hyogo; Hirofumi Goto, Hyogo; Kazuhiro Yokouchi, Hyogo, all of Japan

[73] Assignees: Mitsubishi Denki Kabushiki Kaisha, Tokyo; Mazda Motor Corporation, Hiroshima, both of Japan

[21] Appl. No.: 825,828

[22] Filed: Jan. 28, 1992

Related U.S. Application Data

[63] Continuation of Ser. No. 601,123, Oct. 22, 1990, abandoned.

[30] Foreign Application Priority Data

Oct. 24, 1989 [JP] Japan .................................. 1-277543
Oct. 24, 1989 [JP] Japan .................................. 1-277544

[51] Int. Cl.⁵ .................................................. G01S 3/02
[52] U.S. Cl. ...................................... 342/457; 342/357; 364/449; 340/995
[58] Field of Search ........................ 364/449; 340/995; 342/357, 457

[56] References Cited

U.S. PATENT DOCUMENTS

| | | | |
|---|---|---|---|
| 4,532,514 | 7/1985 | Hatano et al. | 340/995 |
| 4,535,335 | 8/1985 | Tagami et al. | 364/449 |
| 4,963,865 | 10/1990 | Ichikawa et al. | 340/995 |

*Primary Examiner*—Theodore M. Blum

[57] ABSTRACT

A navigation system for a movable body wherein a moving locus of the movable body displayed on a screen of display means can be identified readily and clearly from a map displayed on the screen to prevent misunderstanding of the map. The system comprises a map storage device in which a map is stored, a current position detecting device for detecting a current position of the movable body, a locus storage memory for storing therein a locus of the movable body provided by successively detected ones of the current position, a display unit having a screen, and a switching device for the switching between a mode in which the map from the map storage device, a current position and a locus of the movable body from the current position detecting device and the locus storage device are displayed on the screen and a second mode in which the map and the current position are displayed on the screen but the locus is not displayed on the screen. The navigation system further has a function of causing a locus to be displayed on the screen in accordance with a scale of a map displayed on the screen.

4 Claims, 10 Drawing Sheets

NAVIGATION SYSTEM FOR MOVABLE BODY

This application is a continuation of application Ser. No. 07/601,123 filed on Oct. 22, 1990, now abandoned.

BACKGROUND OF THE INVENTION

1. Field of the Invention

This invention relates to a navigation system installed in a movable body such as an automobile, and more particularly to a navigation system for a movable body wherein a map as well as a current position, a locus of movement and so forth of an automobile are displayed on a display unit such as a cathode ray tube to provide driving information to a driver.

2. Description of the Prior Art

A navigation system installed in a movable body, such as an automobile, is generally constituted such that a map of the whole of country or a plurality of divided regional maps are stored as map information in map storage means. The map information is read out in accordance with a demand of an operator and displayed on a display unit such as a cathode ray tube to provide a map for driving to the operator.

Further, a current position of a vehicle is determined by a calculation based detection signals from a distance sensor for detecting a travel distance of the vehicle and a direction sensor for detecting a driving direction of the vehicle. A triangle mark indicative of the current position of the vehicle and a plurality of serial dots indicative of a driving locus are displayed on a map displayed on the display unit so that the position of the vehicle on the map on the screen may be visually discerned. Such navigation system is disclosed, for example, in Japanese Patent Laid-Open No. 53711/1983, Japanese Patent Publication No. 39800/1984 and Japanese Patent Laid-Open No. 165511/1985.

With a system of the type described above, however, while a locus of movement of the vehicle can be displayed in an overlapping relationship on a map displayed on the screen, it is impossible to arbitrarily erase the locus of movement. Accordingly, when the locus of movement is overlapped with one of line segments defining a road, a bridge or the like of the map displayed on the screen during driving of the vehicle, it is often difficult to identify the locus of movement from the line or the locus may be mistaken as the line. Thus, the locus of movement displayed is normally somewhat confusing, and wrong information may be provided to the driver.

Further, in such conventional navigation system as described above, when a locus of movement is to be displayed on the screen, position data are calculated and successively stored into storage means at predetermined intervals of time. Thereafter, upon display of a map, such position data are read out from the storage means and displayed in the form of a plurality of serial dots on the screen.

It is to be noted that, since a map displayed on the screen is limited, when the locus of movement to be displayed on the screen exceeds the limit, setting of a new starting or reference point is effected by means of an operating device to establish a continued display of driving of the vehicle.

While a system of the type described above requires a comparatively small memory capacity because position data are stored intermittently at intervals, since position data are stored into a single locus memory after each fixed interval of time, dots displayed on the screen and indicative of a locus of movement are spaced from each other by a fixed distance. Consequently, even when a map displayed on the screen is replaced by another map having a different scale, for example, when a wide area map is replaced by a detailed map, the distance between dots of the locus of movement is maintained, and consequently, the driving locus is not displayed correctly in accordance with the new map of the different scale. Accordingly, the locus of movement to the current position cannot be visually discerned correctly.

Further, each time the driving locus displayed on the screen comes to a limit of the display, setting of a new starting point must be effected. Such setting operation, however, is very cumbersome during driving of the vehicle.

SUMMARY OF THE INVENTION

It is an object of the present invention to provide a navigation system for a movable body wherein a moving locus of the movable body displayed on a screen of display means can be identified readily and clearly from a map displayed on the screen to prevent misunderstanding of the map.

It is another object of the present invention to provide a navigation system for a movable body wherein a moving locus is displayed on a screen of display means in accordance with a scale of a map displayed on the screen to provide correct information of a locus of movement to a driver.

In order to attain the objects, according to one aspect of the present invention, there is provided a navigation system for a movable body, which comprises map storage means in which a map is stored. There is current position detecting means for detecting a current position of the movable body with respect to the map, with locus storage means for storing therein a locus of the movable body provided by successive ones of the current position detected successively by the current position detecting means. Display means having a screen for normally displaying thereon the map from the map storage means, a current position of the movable body from the position detecting means and a locus of the movable body from the locus storage means. Selectively operable switching means are provided for the switching between a first mode in which the map from the map storage means, a current position of the movable body from the current position detecting means and a locus of the movable body from the locus storage means are displayed on the screen and a second mode in which the map from the map storage means and a current position of the movable body from the current position detecting means are displayed on the screen. A locus of the movable body from the locus storage means is not displayed on the screen. Preferably, the storage means has a plurality of maps stored therein, and the navigation system further comprises manually operable means for designating one of the maps stored in the storage means to be displayed on the screen of the display means.

With the navigation system, if the first mode is selected, then the intended map and a current position and a locus of movement of the movable body are displayed on the screen of the display means. On the other hand, if the second mode is selected, then the intended map and a current position of the movable body are displayed on the screen of the display means while a locus of movement of the movable body is not displayed. Accordingly, when it becomes difficult, during movement of the movable body, to visually discern a locus of movement of the movable body from a line indicating a road, a river or the like of the map displayed on the screen, an operator of the movable body will select the second mode. Consequently, the locus of movement of the movable body is erased from the screen of the display means. Accordingly, the locus of movement of the movable body displayed on the screen of the display means can be identified readily and clearly from the map displayed on the screen, and consequently, misunderstanding of the map is prevented and safe movement of the movable body can be attained.

According to another aspect of the present invention, there is provided a navigation system for a movable body, which comprises map storage means in which a plurality of maps including a common region and having different scales are stored, current position detecting means for detecting a current position of the movable body, a plurality of locus memories provided corresponding to the scales of the maps stored in the map storage means for storing therein current position data received successively from the current position detecting means at respective predetermined time intervals corresponding to the scales thereby to store the successive current position data for respective predetermined periods of time corresponding to the scales as locus data, display means having a screen for displaying thereon a map and a current position and a locus of the movable body based on map data, current position data and locus data received from the map storage means, the current position detecting means and one of the locus memories, respectively, and display controlling means for controlling the display means to display a map and a locus of the movable body based on those of the map data corresponding to a designated one of the scales and locus data from one of the locus memories corresponding to the designated scale, respectively.

With the navigation system, after the movable body starts its movement, information of the map corresponding to a designated one of the scales and locus data corresponding to the designated scale are read out from the storage means and transmitted to the display means. Consequently, a map of the designated scale and a locus of movement of the movable body corresponding to the scale of the map are displayed on the screen of the display means. Accordingly, even if a map of a scale displayed on the screen of the display means is replaced by another map of another scale different from the scale of the preceding map, a locus of the movable body is displayed corresponding to the newly displayed map on the screen of the display means and the locus to the current position can be visually discerned appropriately on the screen.

The above and other objects, features and advantages of the present invention will become apparent from the following description and the appended claims, taken in conjunction with the accompanying drawings.

DESCRIPTION OF THE PREFERRED EMBODIMENTS

Figure 1:
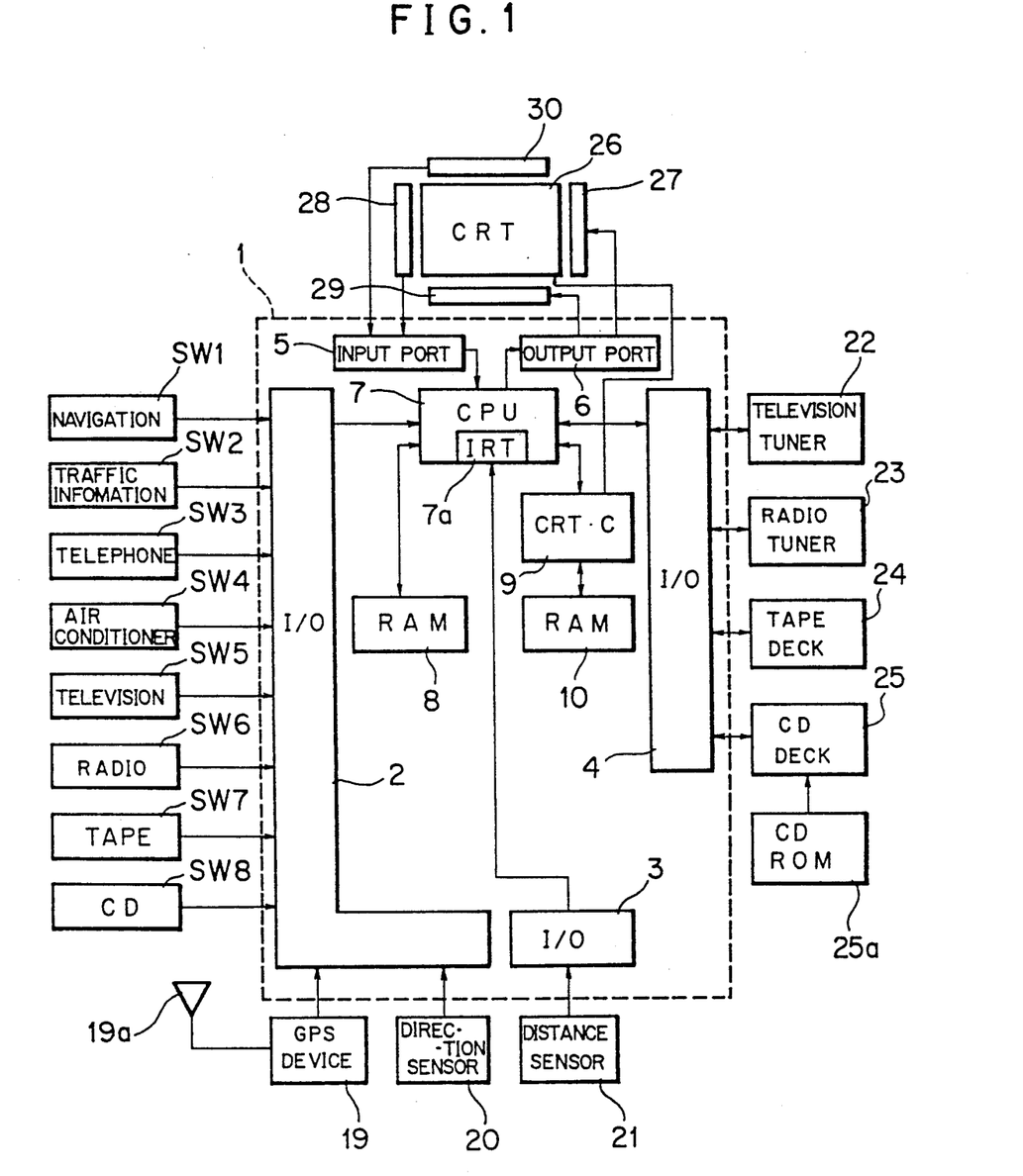
FIG. 1 is a block diagram of a navigation system for a movable body showing a preferred embodiment of the present invention.

Referring first to FIG. 1, there is shown entire construction of a navigation system for a movable body to which the present invention is applied. The navigation system includes a controlling device 1 including three input/output interface circuits 2, 3 and 4, an input port 5, an output port 6, a central processing unit (CPU) 7, a CRT (cathode ray tube) controller 9, and a pair of RAMs (random access memories) 8 and 10. The controlling device 1 operates with stabilized power supplied from a car-carried battery not shown by way of a stabilized power source or constant voltage circuit not shown to control various devices connected to the controlling device 1.

Figure 2:
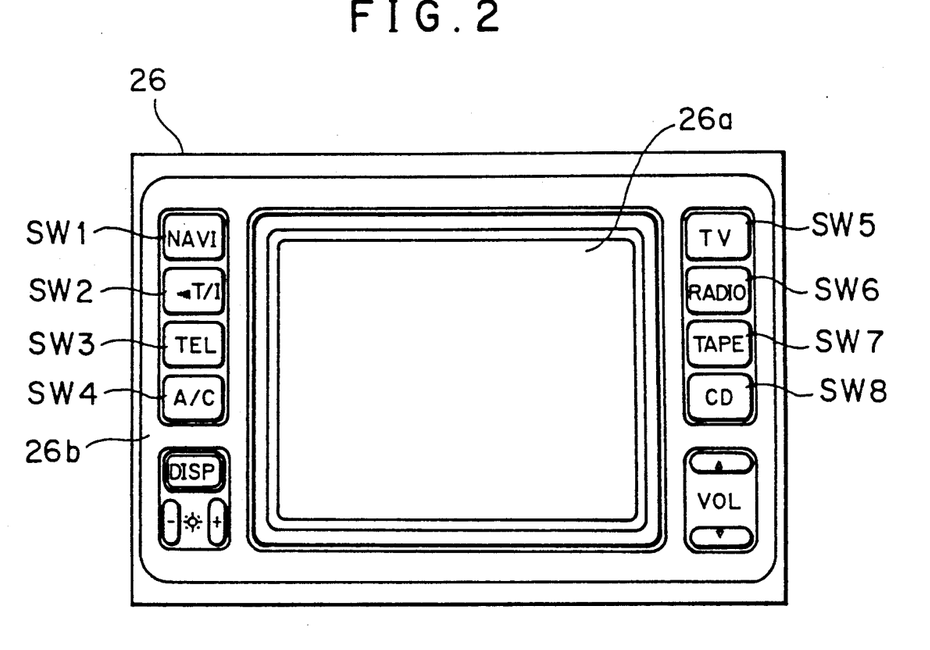
FIG. 2 is a front elevational view of a display unit for use with the navigation system of FIG. 1.

Connected to the first input/output interface circuit 2 are eight function switches including a navigation mode selecting switch SW1 for the navigation of driving of a vehicle, a traffic information mode selecting switch SW2 for receiving traffic information broadcasting, a wireless telephone mode selecting switch SW3 for an automobile telephone, an air conditioner mode selecting switch SW4 for the air conditioning of a room of the vehicle, and video/audio switches for operating video/audio sources including a television switch SW5, a radio switch SW6, a tape player switch SW7 and a compact disk (CD) player switch SW8. The mode function switches SW1 to SW8 are disposed on a front panel 26b of a display unit or cathode ray tube (CRT) 26 as shown in FIG. 2, and when one of the function switches SW1 to SW8 is selectively operated, a corresponding function is rendered operative.

The first input/output interface circuit 2 is further connected to a GPS (satellite navigation) device 19 for receiving radio waves from an artificial satellite by way of an antenna 19a and confirming and determining a current position, a moving speed and so forth of the automobile based on such radio waves received, and a direction sensor 20 for decomposing terrestrial magnetism into a component in an advancing direction of the vehicle and another component in a direction perpendicular to the advancing direction by means of a terrestrial magnetism detector of the flux gate type or the like mounted on the vehicle and outputting a signal corresponding to such components as a vehicle advancing direction $\theta$.

The second input/output interface circuit 3 is connected to a distance sensor 21 for detecting rotation of a wheel of the vehicle by means of an electromagnetic pickup, a lead switch or the like and outputting a pulse signal which increases in proportion to the rotational speed of the wheel. It is to be noted that current position detecting means for obtaining data of a current position of the vehicle and also data of a locus of movement of the vehicle is constituted from the direction sensor 20 and distance sensor 21.

The third input/output interface circuit 4 is connected to video/audio devices such as a television tuner 22, a radio tuner 23, a tape deck 24 and a CD deck 25. A CD ROM (read only memory) 25a serving as map storage means is provided on the CD deck 25, and when the navigation mode selecting switch SW1 is selectively operated, information of various maps, line data and so forth which will be hereinafter described are read out from the CD ROM 25a so that they may be displayed on the CRT 26.

It is to be noted that, as the CD ROM 25a described above, a memory for the storage of map information disclosed in NIKKEI ELECTRONICS, No. 434, Nov. 26, 1987 is adopted, and map information including a map of the whole of a country, maps of districts, maps of regions and maps of areas are stored as vector data in the memory. Further, in the present embodiment, the map information includes three kinds of maps of wide area maps, standard maps and detailed maps having different scales, and such map information for the different kinds of maps is stored such that they may cover a common area.

It is also to be noted that each of the area maps mentioned above is divided into four sections corresponding to the four quadrants of the screen 26a of the CRT 26, and data of such four map blocks which make up a partial map are successively stored as map information in the CD ROM 25a such that four times a map block which is part of the partial block may make a background of the screen 26a. Further, lines interconnecting different points on each area map, for example, lines indicative of roads, rivers, bridges and so forth are stored in a divided condition as line data while character data of characters, symbols and so forth as well as service data of hotels, golf links and so forth as service symbols are also stored in the CD ROM 25a. Then, as regards particular items such as roads, rivers and bridges, they are stored each in the form of a color code representative of a plurality of colors in order to allow display thereof in various colors. Further, in order to allow each of the items in any color other than the color code, the CD ROM 25a has a plurality of memory tables stored therein in the form of color codes for a large number of color pallets. In addition, dot data for shadowing the screen 26a and dot data for shadowing also an area of the screen 26a in which an icon which serves as a touch pattern is displayed are also stored in the CD ROM 25a.

The CPU 7 controls operation of the video/audio devices in response to a selective operation of the function switches SW1 to SW8, reads map information and so forth from the CD ROM 25 and provides a control signal to the CRT 26 to display the thus read map information on the screen 26a of the CRT 26. Further, the CPU 7 receives a pulse signal from the distance sensor 21, a GPS signal from the GPS device 19 and digital signals of X and Y components of a direction from the direction sensor 20 all by way of an interrupt circuit (IRT) 7a, executes calculation processing to find out a current position included in running locus information, and outputs a display signal. Further, a current position is stored after each predetermined interval of time to obtain a driving locus also included in driving locus information.

Figures 3A, 3B, 3C:
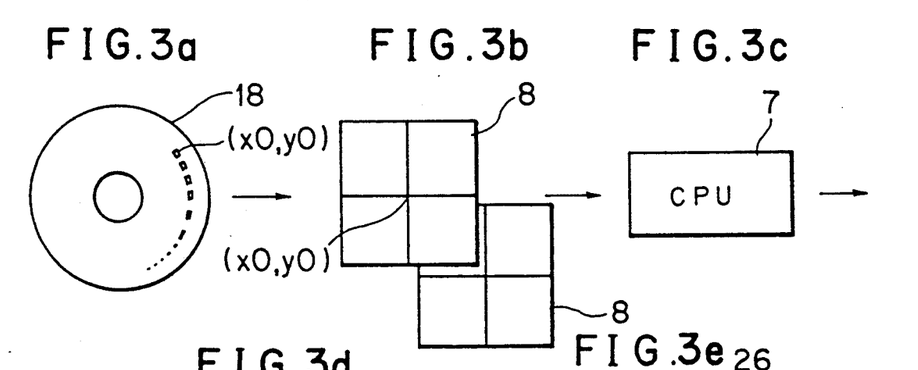
FIGS. 3a to 3e are schematic views illustrating a principle of the present invention.
Figure 3D:
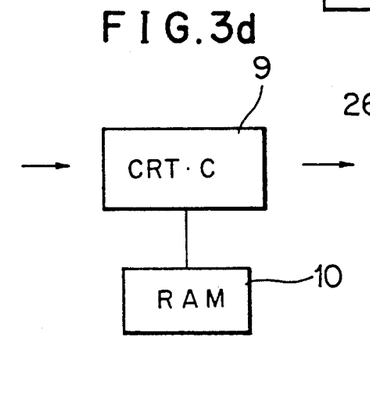

The RAM 8 serves as temporary storage means and is normally backed up from a car-carried battery so that data read out from the CD ROM 25a shown in FIG. 3a at a step when calculation processing is to be executed by the CPU 7 may be temporarily stored and maintained in the RAM 8 as seen in FIG. 3b. Then, when map information is read out from the RAM 8, also line data are read out as part of such map information, and when a desired map is selected, data are taken out so that various lines may be overlapped with the map. It is to be noted that map information is stored into the RAM 8 such that coordinates (x0, y0) of a current position stored in a first memory table of the CD ROM 25a may coincide with the center of the screen 26a, and if the current position data are read out, then they are displayed as a current position mark M at the center of the screen 26a. Further, the RAM 8 includes a memory table for storing position data in order to allow display of a driving locus on the screen 26a of the CRT 26, and in the present embodiment, the RAM 8 includes a plurality of memory tables forming an endless loop for map information of individual maps of different scales stored in the CD ROM 25a.

Figure 15:
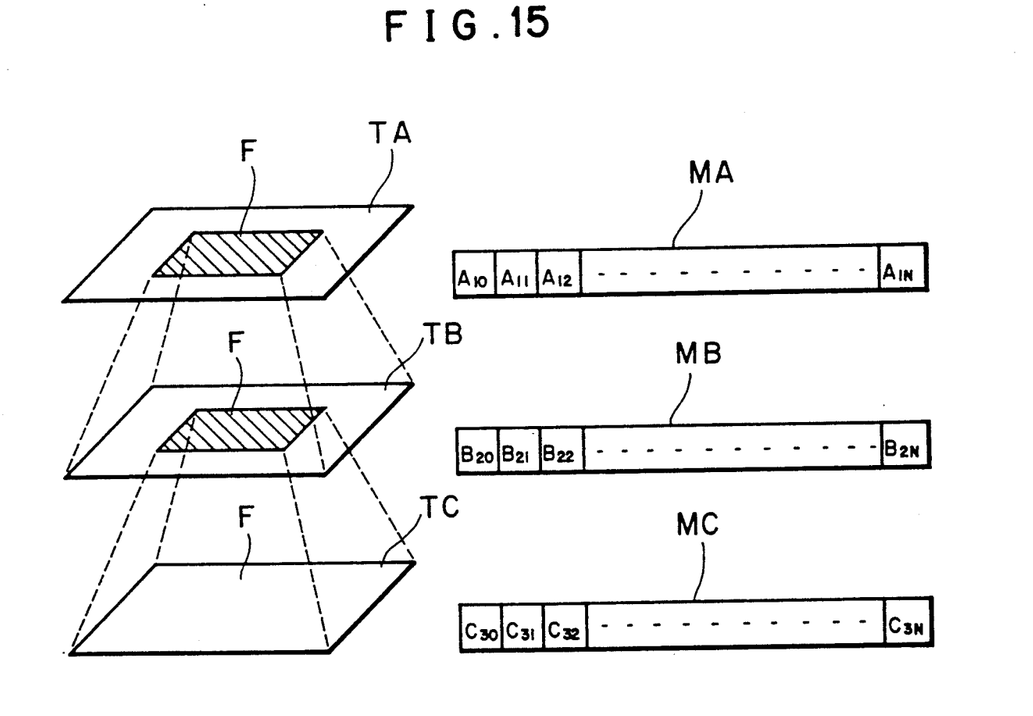
FIG. 15 is a diagrammatic view illustrating a relationship between maps and locus memories of a RAM of the navigation system of FIG. 1.

More particularly, referring to FIG. 15, the RAM 8 includes three memory tables MA, MB and MC. The memory tables MA, MB and MC individually serve as locus memories for storing therein current position data and correspond to three kinds of map screens TA, TB and TC of different scales, respectively. In particular, the map screen TA shows a wide area map of a particular region; the map screen TB shows a standard map wherein a common section F of the wide area map TA is enlarged to a predetermined scale; and the map screen TC shows a detailed map wherein the common section F of the standard map TB is enlarged to another predetermined scale. Meanwhile, the memory table MA corresponds to the wide area map TA; the memory table MB corresponds to the standard map TB; and the memory table MC corresponds to the detailed map TC.

Figure 13:
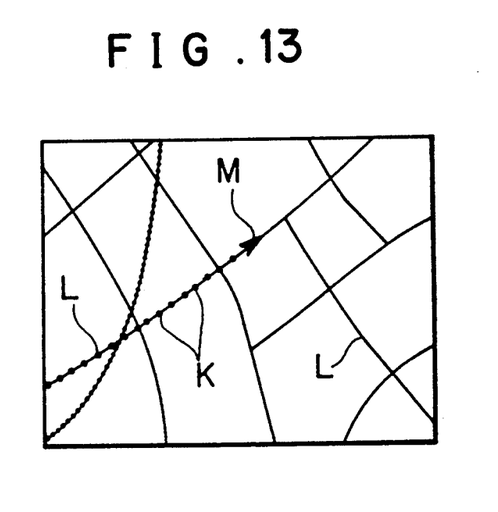
FIG. 13 is a schematic view showing the screen of the display unit of FIG. 2 on which a map, a current position and a locus are displayed.

Referring back to FIG. 1, the CRT controller 9 serves as information display means and is provided to receive a command for the outputting of a display signal from the CPU7, develop driving locus information into the display RAM 10 and output a video signal and a synchronization signal for causing map data, character data, driving locus information and so forth stored in the RAM 10 to be displayed on the CRT 26. It is to be noted that the CPU 7 reads out information of one of enlarged, standard and detailed maps stored in the CD ROM 25a which corresponds to a designated scale and driving locus information corresponding to the map information from a memory table of the RAM 8 and causes a driving locus K to be displayed in an overlapping relationship on a line L on a map as seen in FIG. 13.

Figure 3E:
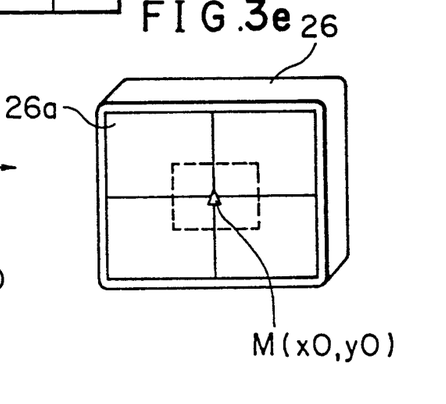
Figure 11:
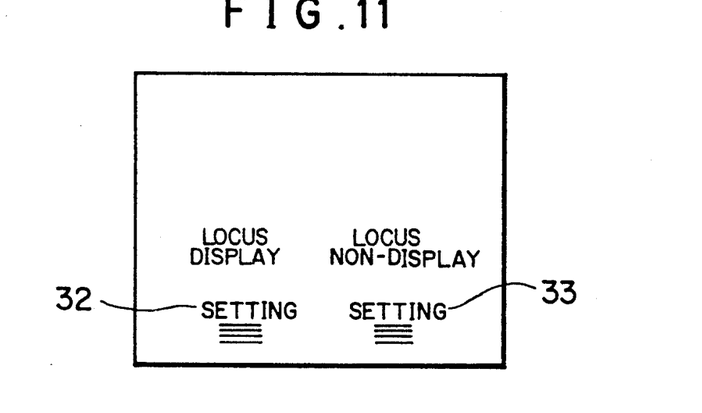
FIG. 11 is a schematic view illustrating a setting pattern displayed on the screen of the display unit of FIG. 2.

The display RAM 10 has stored therein, in addition to additional information such as a map number, a kind of a scale and so forth, data of patterns which are used to display operation keys for driving such various devices as described above as touch switches on the screen 26a of the CRT 26. The pattern data include data of a current position mark (M, refer to FIG. 3e) which is displayed as a triangle on the screen 26a of the CRT 26, a locus display pattern 32 which is a first mode for displaying a driving locus K in the form of a plurality of serial dots and a locus non-display pattern 33 which is a second mode for erasing a displayed driving locus K from the screen 26a of the CRT 26 as shown in FIG. 11, and such pattern data are stored as switching means for inputting a switching signal to the CPU 7, that is, as touch switches, in the display RAM 10. The display RAM 10 further has stored therein, though not shown, a scroll key pattern for arbitrarily scrolling a map displayed on the screen 26a of the CRT 26, a correction mark position serving as correction position mark display means for correcting the position of the current position mark M displayed on the screen 26a, a returning pattern serving as map returning means for returning a scrolled map to its original position, a correction pattern serving as current position mark correcting means for moving, upon movement of the current position mark M, to the position of the correcting position mark, and so forth. Further, also enlarging and reducing patterns for selecting a scale of a map and so forth are stored in the display RAM 24.

The CRT 26 displays a map of a particular section, a driving locus, a current position and so forth in color thereon in response to a video signal and a synchronization signal from the CRT controller 9. Further, various operation keys of a touch switch section which will be hereinafter described are displayed in a predetermined touch area of the CRT 26, and if the television switch SW5 is depressed to cause the television tuner 22 to be switched on, then a television image can be displayed on the CRT display 26.

A pair of light emitting devices 27 and 29 are connected to the CPU 7 by way of the output port 6 while a pair of light receiving devices 28 and 30 are connected to the CPU 7 by way of the input port 5, and the light emitting and receiving devices 27 to 30 are disposed on an inner frame on a surface of the CRT 26 such that the light emitting devices 27 and 29 are opposed to the light receiving element 28 and 30, respectively, to constitute a touch panel section for touch switches. It is to be noted that the touch panel section is constituted such that, though not shown, it is divided into a large number of touch areas in horizontal and vertical directions, and when a certain one of the touch areas is touched by an operator, infrared rays which are to pass the certain area in horizontal and vertical directions are intercepted to produce a driving signal for providing various instructions. More particularly, if the screen 26a of the CRT 26 is touched by an operator, a suitable operation pattern or patterns are displayed on the screen 26a, and then if one of the patterns is touched, then setting of starting or stopping of operation of a device or setting of a time, a numeric value or the like can be performed correspondingly.

Operation of the navigation system for a movable body having such construction as described above will be described will be described subsequently with reference to flow charts shown in FIGS. 4 and 8 to 10.

Figure 4:
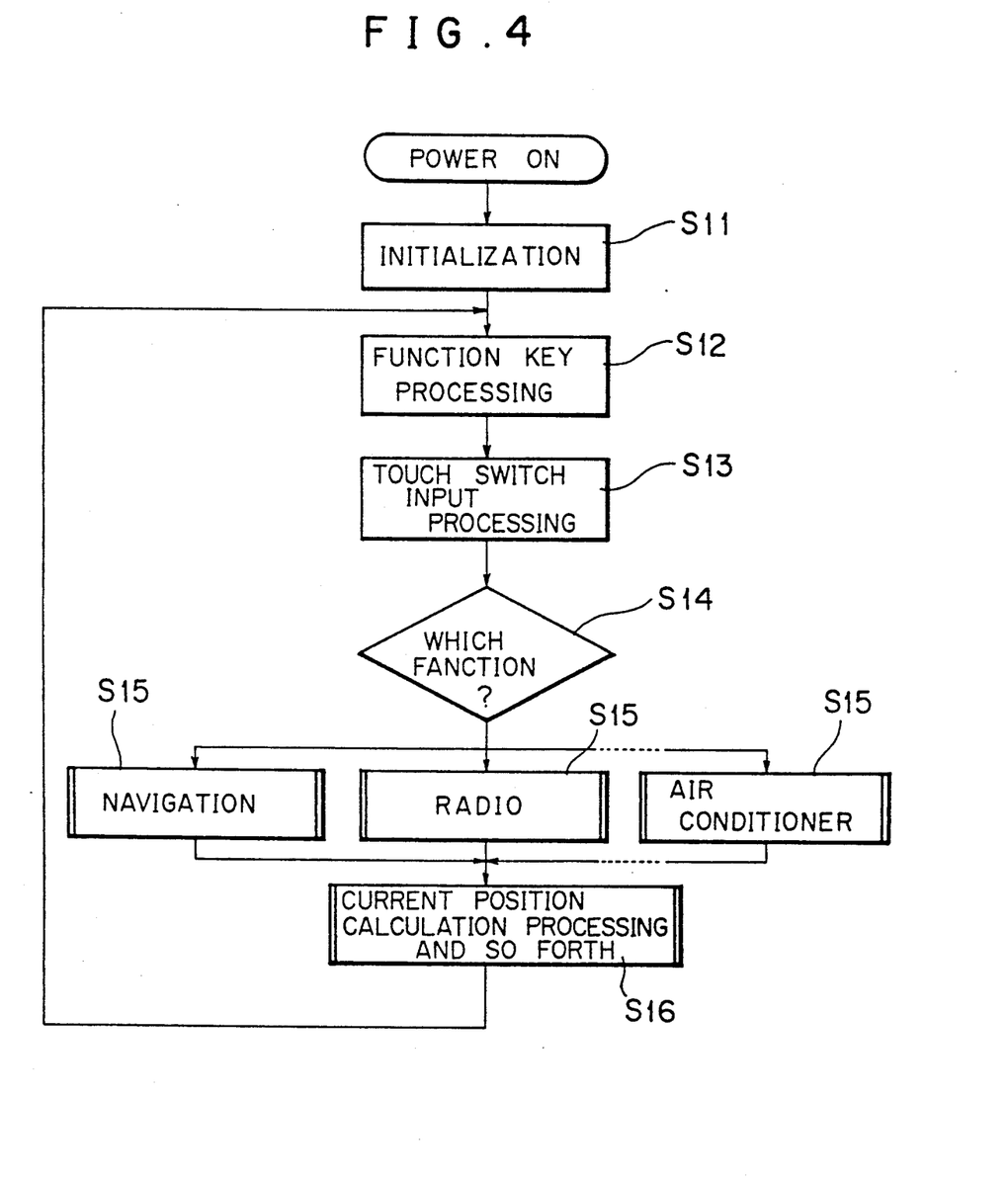
FIG. 4 is a flow chart illustrating calculation processing of a main routine of a controlling section of the navigation system of FIG. 1.
Figure 5:
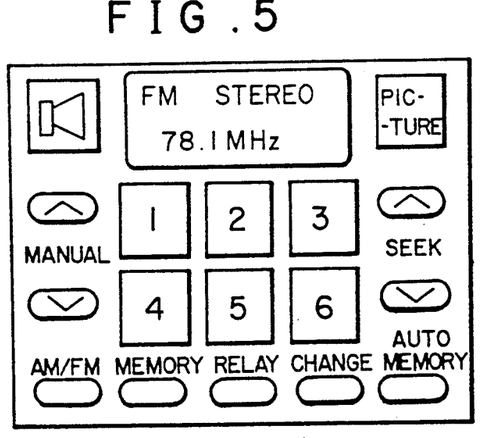
FIGS. 5 to 7 are schematic illustrations showing different menus displayed on a screen of the display unit of FIG. 2.
Figure 6:
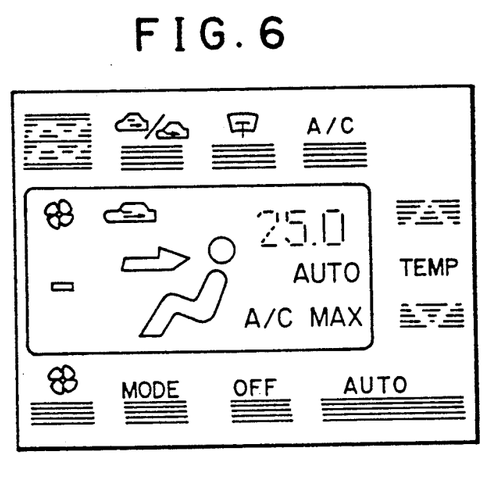

If a key switch not shown of the automobile is turned on in order to start driving of the automobile, electric power is supplied from the car-carried battery not shown so that electric systems of the automobile are rendered operative. Thereupon, also the CPU 7 of the controlling section 1 is rendered operative by way of the stabilized power source and starts its operation in accordance with the flow chart shown in FIG. 4. Referring to FIG. 4, the CPU 7 first initializes itself at step S11 and then repeats calculation processing illustrated in the main routine of FIG. 4 for each period of several tens milliseconds or so. In particular, at step S12, processing of function keys is executed, that is, the switches SW1 to SW8 are accessed, and then at step S13, input processing of touch switches is executed, that is, the light emitting and receiving devices 27 to 30 of the CRT 26 are accessed. Then, if it is judged at step S14 that an operator depresses one of the mode selection switches such as, for example, the radio switch SW6 or air conditioner switch SW4, such a pattern of a radio mode as shown in FIG. 5 or such a pattern of an air conditioner mode as shown in FIG. 6 is displayed, at step S15, on the screen 26a of the CRT 26 in accordance with the depressed mode selection push-button. Then, if an area of a switch pattern provided on a display screen of the thus selected mode is touched by the operator, then the selected device is operated in accordance with a desired setting. During the operation of the selected device after such selection by touching of the area, the control sequence advances to step S16 at which the CPU 7 executes calculation processing of a current position and so forth. After then, the control sequence returns to step S12 to repeat such a sequence of operations as described above.

Figure 8:
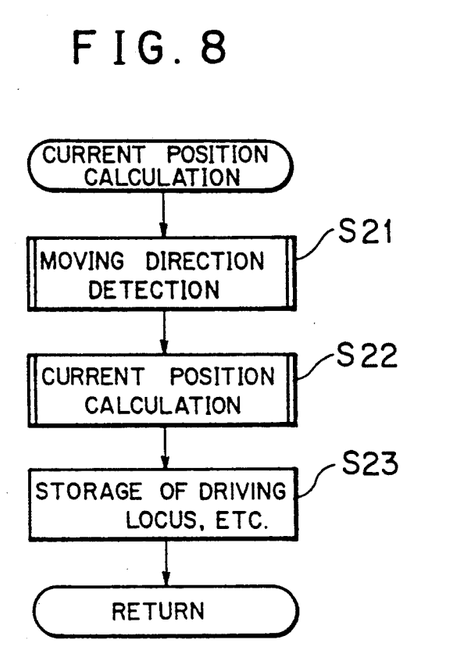
FIG. 8 is a flow chart illustrating calculation processing at step S16 of a main routine for the navigation.

Details of operation at step S16 are illustrated in detail in FIG. 8. Referring now to FIG. 8, first at step S21, a travel distance of the vehicle is detected by the distance sensor 21. Then at step S22, a calculation of a current position is executed, and then at step S23, current position data obtained by such calculation are stored as driving locus data successively into the RAM 8 for the temporary storage.

Accordingly, after the automobile starts its driving, driving locus information such as a travel distance and a driving locus to the current position can be obtained in this manner.

While the calculation processing to find out a current position and so forth of the vehicle as described just above may be executed as at step S16 in the processing of the main routine shown in FIG. 4, preferably the current position of the vehicle is determined periodically at suitable time intervals corresponding to a current speed of the vehicle in order to detect the current position with suitable accuracy. To this end, such calculation processing is executed in interrupt processing.

Figure 9:
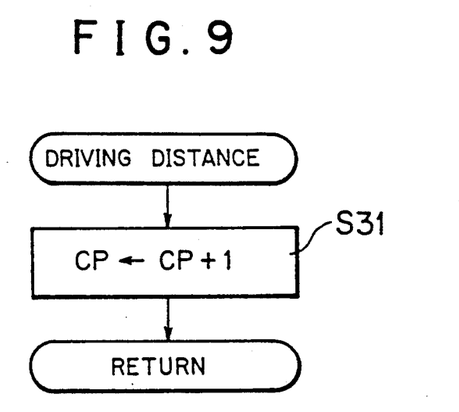
FIG. 9 is a flow chart illustrating external interrupt calculation processing based on a distance pulse from a distance sensor of the navigation system of FIG. 1.

Referring now to FIG. 9, there is shown an external interrupt routine. In particular, after the automobile is started, a pulse signal is successively developed from the distance sensor 21 and transmitted to the CPU 7 by way of the interrupt circuit 7a. In response to such pulse signal, the routine shown in FIG. 9 is entered. In the routine, at step S31, a pulse count CP is incremented by one by the CPU 7 to obtain a travel distance to the current position. Naturally, the rate of increase of such pulse count CP increases in proportion to the speed of the vehicle.

Figure 10:
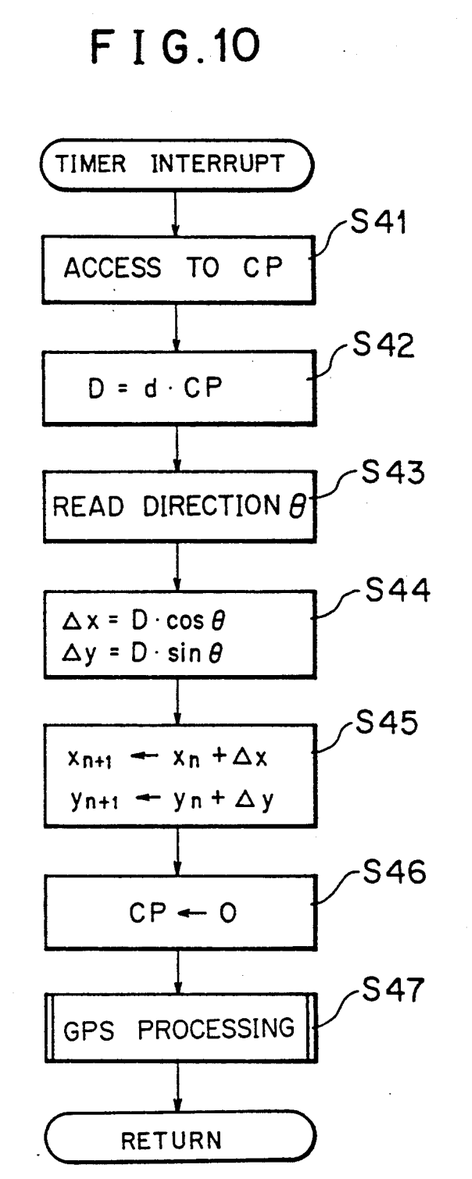
FIG. 10 is a flow chart showing a timer interrupt calculation routine based on a distance pulse from the distance sensor and a signal from a direction sensor of the navigation system of FIG. 1.

Then, while the automobile is travelling, another interrupt processing routine shown in the flow chart of FIG. 10 is executed at predetermined time intervals, for example, of 1 second, that is, independently of the speed of the vehicle. Referring to FIG. 10, first at step S41, a pulse count CP obtained at step S31 of the routine of FIG. 9 is accessed. Then at step S42, the pulse count CP then is multiplied by a unit travel distance d, for example, 39.25 cm to find out a travel distance D for the fixed period of time. Then at step S43, a direction $\theta$ is read in from the direction sensor 20. Subsequently at step S44, a position of the vehicle on a two dimensional coordinate system is calculated in the following expressions from the direction $\theta$ and the travel distance D calculated at step S42:

$$\Delta x = D \cos \theta$$

$$\Delta y = D \sin \theta$$

After then, at step S45, a current position (x, y) of the vehicle is calculated in accordance with the following expressions from the coordinates ($\Delta x$, $\Delta y$) calculated at step S45 and the coordinates (xo, yo) of the starting point:

$$x_{n+1} \leftarrow x_n + \Delta x$$

$$y_{n+1} \leftarrow y_n + \Delta y$$

As a result, the travel distance D to the current position which varies every moment is obtained while a latitude and a longitude are determined after each fixed interval of time to recognize the current position (x, y). It is to be noted that the data of the current position (x, y) are transmitted to and successively stored into the RAM 8 for the temporary storage while successively erasing oldest stored data in the RAM 8 in an endless manner as hereinafter described in detail with reference to FIG. 16. Further, even if driving of the automobile is stopped and the key switch is switched off, data of the current position (x, y) and the travel distance D are maintained in the RAM 8.

Subsequently at step S46, the pulse count CP is cleared to zero. Then at step S47, a GPS signal is received from the GPS device 19 and calculation processing for the execution of GPS processing is executed. As a result, absolute values of a longitude and a latitude are determined for each fixed period of time, for example, for each one second, and accordingly, correction of driving locus information can be achieved.

Figure 7:
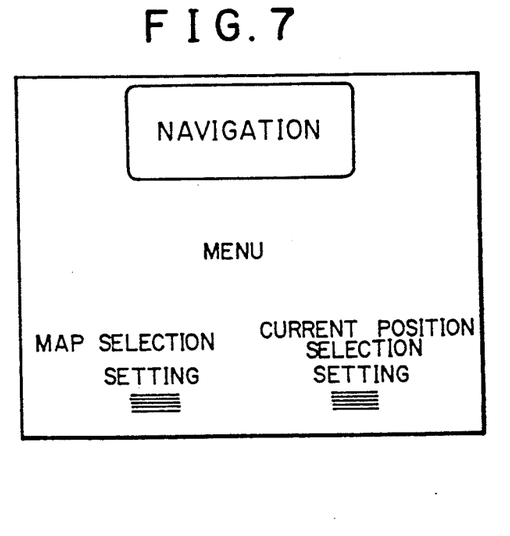

By the way, when the automobile is to be started, first the navigation mode selecting switch SW1 will be depressed. Consequently, setting patterns for map selection and a current position are displayed as a menu on the screen 26a of the CRT 26 as shown in FIG. 7. Then, if either one of the setting patterns is touched by the operator, then a navigation display mode illustrated in FIG. 12 is started.

Figure 12:
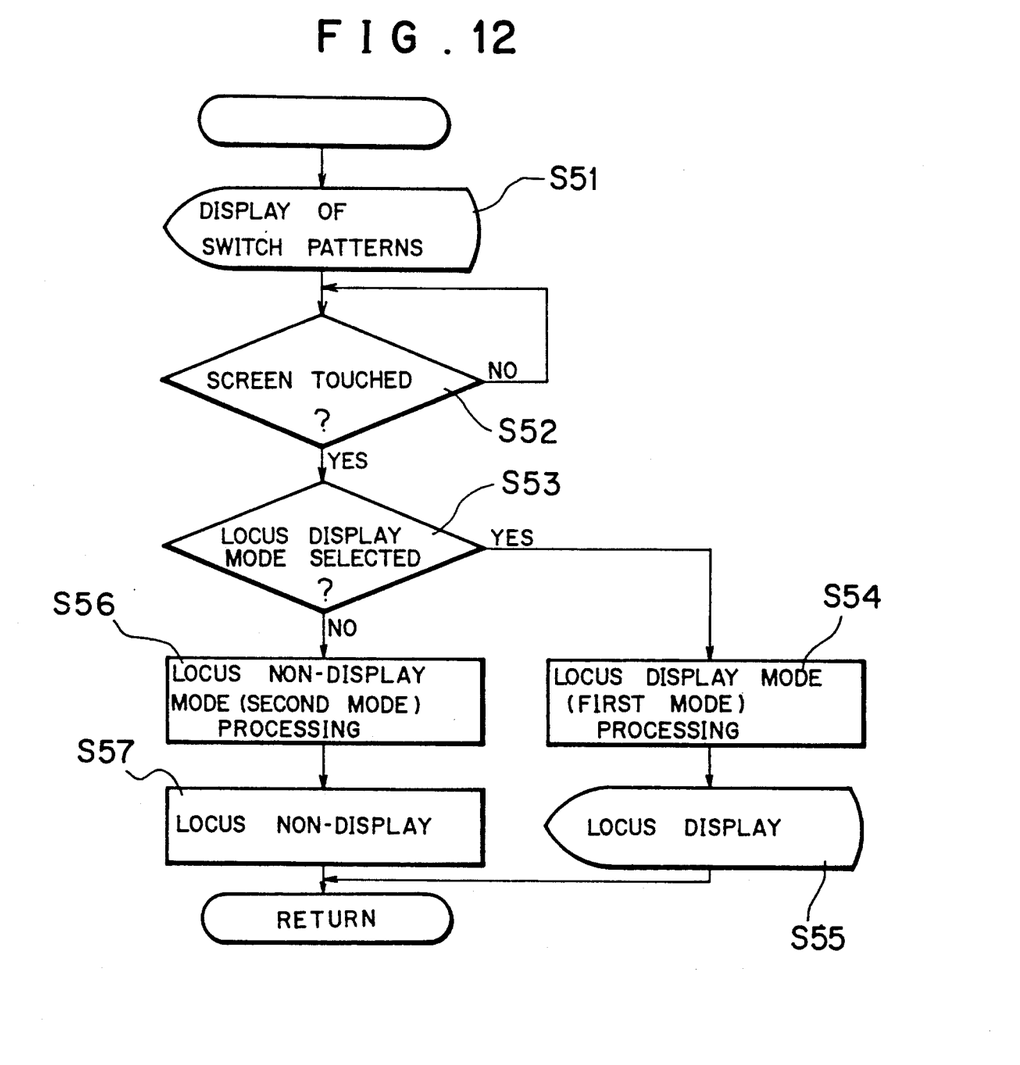
FIG. 12 is a flow chart illustrating detailed calculation processing of a locus display mode and a locus non-display mode at step S15 of the main routine of FIG. 4.

Referring to FIG. 12, first at step S51, switch patterns of "locus display" (a first mode) and "locus non-display" (a second mode) are displayed on the screen 26a as shown in FIG. 11. Then, it is waited at step S52 that the operator touches either one of the switch patterns on the screen 26a of the CRT 26.

If it is assumed that automobile is travelling and the operator selects the locus display mode and thus touches the setting pattern 32 therefor at step S53, then the control sequence advances by way of step S53 to step S54 at which a driving signal is developed to execute processing of the locus display mode. In particular, at step S54, map information and line data are first read in from the CD ROM 25a by way of the compact disk deck 25, and then current position data and driving locus data are read in from the RAM 8 for the temporary storage, whereafter the data thus read in are transmitted to the CRT 26 at step S55. Consequently, a road map and lines L of a road or roads and a railway line or lines are displayed on the screen 26a of the CRT 26 as seen in FIG. 13. Further, the current position mark M indicative of the current position of the automobile and the driving locus K indicative of the driving locus of the automobile till then are indicated on a road L. Accordingly, the driver can discriminate the current position and the driving locus necessary for driving.

By the way, during driving, the automobile may enter a trunk road or an alley or narrow street, and the driving locus K may not be discriminated readily from a line L of such trunk road or narrow street. Thus, in order to allow distinction among a road, a river, a railway line and so forth, lines L of them are normally made different from one another in color or in line width. Consequently, if a driving locus K is displayed in an overlapping relationship, for example, on a trunk road indicated by a line L having a comparatively great line width, then dots of the driving locus K may be hidden by the wide line L. On the other hand, in case a line L of a load or another line L of a railway line is indicated in similar color to that of the driving locus K, it may be difficult to distinguish the locus K from the line L.

Figure 14:
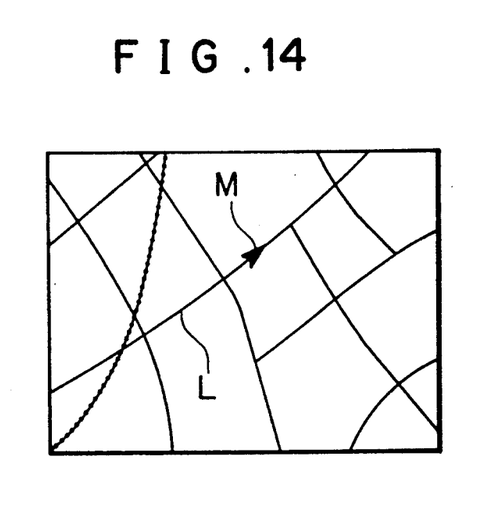
FIG. 14 is a similar view but showing the screen of the display unit of FIG. 2 on which only a map and a current position are displayed.

Thus, in order to eliminate such indistinctness, the driving locus K should be erased temporarily. In such instance, the setting pattern 32 for the locus non-display mode (second mode) of the setting patterns 32 and 33 displayed on the screen 26a of the CRT 26 will be selectively touched. This is judged at step S53, and the control sequence now advances to step S56 at which processing of the locus non-display mode is executed, and consequently, at subsequent step S57, only the map and the current position mark M are displayed on the screen 26a of the CRT 26 while the driving locus K is not displayed on the screen 26a as seen in FIG. 14. Accordingly, the driver can watch the road on the map accurately while confirming the position of the automobile on the map.

As described so far, the navigation system for a movable body of the present embodiment is constituted such that patterns of the locus display mode in which a road map, the current position mark M of the automobile and a driving locus K are displayed on the screen 26a of the CRT 26 and the locus non-display mode in which only a map and the current position mark M are displayed while a driving locus K is not displayed are displayed and besides switching means for the switching between the two modes is displayed as the setting patterns 32 and 33.

Accordingly, if the locus display mode is selected upon driving of the automobile, the current position M and the driving locus K of the automobile can be visually discerned on a map displayed on the screen 26a of the CRT 26. Meanwhile, when it becomes difficult during driving of the automobile to distinct the driving locus K from a line L of a road along which the automobile moves, if the mode is switched to the locus non-display mode, then the driving locus K can be erased from the screen 26a of the CRT 26. On the other hand, if it becomes necessary, it is possible to switch the mode back to the locus display mode so that the driving locus K may be displayed on the screen 26a. In this manner, since a driving locus can be temporarily erased from the screen 26a of the CRT 26 in accordance with the necessity, there is an effect that indistinctness between a driving locus K and any of various lines L and possible mistake of a map can be prevented.

Figure 16:
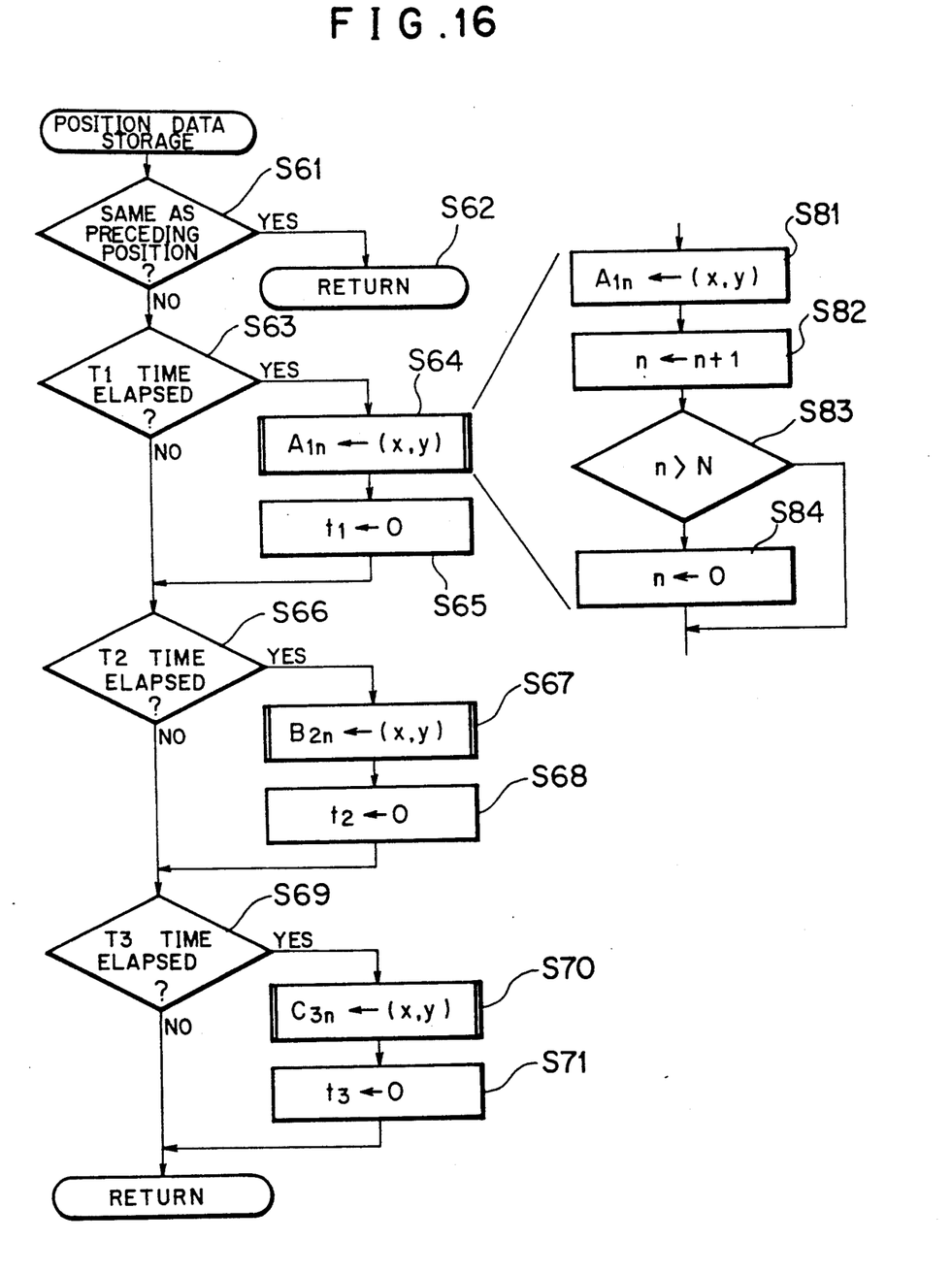
FIG. 16 is a flow chart illustrating details of calculation processing for storing position data into the locus memories of FIG. 15.

Subsequently, storage of data of current position (x, y) obtained at step S45 in FIG. 10 into the RAM 8 will be described in detail with reference to the flow chart of FIG. 16. The processing of the flow chart of FIG. 16 may be executed after step S45 in the processing of FIG. 10 though not shown as such. It is to be noted that, in the present embodiment, data of a current position (x, y) obtained by a calculation during driving of the automobile as described hereinabove are stored at three different sampling rates, that is, at three different time intervals T1 (8 seconds), T2 (4 seconds) and T3 (2 seconds) into different memory tables corresponding to maps TA, TB and TC having different scales as described hereinabove.

After position data (x, y) are calculated, the present routine is entered, and it is judged first at step S61 whether or not the position data (x, y) have the same values as the preceding position data. Then, if the judgment is in the affirmative (YES), then this means that the automobile is in a stopped condition, and the sequence advances to step S62 at which the control sequence returns to an original step at which the present routine has been entered. On the contrary, if the judgment at step S61 is in the negative (NO), then the control sequence advances to step S63 so that the position data may subsequently be stored at a sampling rate corresponding to a scale of the map. In particular, at step S63, it is judged whether or not the time T1 (8 seconds) has elapsed, that is, a corresponding time count t1 is equal to or greater than T1. If the judgment is YES, then the sequence advances to step S64 at which the position data are stored into one ($A_{1n}$) of the storage areas $A_{10}$ to $A_{1N}$ of the memory table MA as seen in FIG. 15 with reference to a parameter n which varies from 0 to N corresponding to the storage areas $A_{10}$ to $A_{1N}$. In particular, as illustrated in a detailed flow chart of the step S64 shown at a right-hand side portion of FIG. 16, the position data are stored into a storage area $A_{1n}$ designated by a position data count value of n at step S81. Then at step S82, the number of position data, that is, the position data count n is incremented by one. Subsequently at step S83, it is judged whether or not the position data count n is greater than N which is a maximum storage capacity of the memory table MA. Here, if the judgment is YES, then this means that the number of position data exceeds the memory capacity, and accordingly, the count value n is reset to 0 at step S84, whereafter the sequence advances to step S65. On the other hand, when the judgment at step S83 is NO, the sequence directly advances to step S65. At step S65, the set time t1 is cleared to 0 after lapse of the set time T1 (8 seconds).

Accordingly, position data for a predetermined period of time are stored into the memory table MA for the wide area map TA.

Subsequently, a storing operation into the memory table MB is executed in a side by side relationship to the operation described just above. First at step S66, it is judged whether or not the predetermined time T2 (4 seconds) has elapsed, that is, a corresponding time count t2 is equal to or greater than T2. Then, if the judgment is NO, then the sequence advances directly to step S69, but on the contrary if the judgment is YES, then the sequence advances to a subroutine at step S67. In the subroutine at step S67, similar processing to that at step S64 described above is executed with a parameter m which varies from 0 to N. Then at step S68, the time count t2 is cleared to 0.

Consequently, position data for another predetermined period of time are finally stored into the storage areas $B_{20}$ to $B_{2N}$ of the memory table TB for the standard map TB.

Further, a storing operation into the memory table MC is also executed in a side by side relationship to the operations described just above. Also in this instance, after it is judged at step S69 whether or not the predetermined time T3 (2 seconds) has elapsed, that is, a corresponding time count t3 is equal to or greater than T3, similar processing to that of the subroutine described above is executed at step S70 with a parameter l which varies from 0 to N. Then at step S71, the time count t3 is cleared to 0. Consequently, position data for a predetermined period of time are finally stored into the storage areas $C_{30}$ to $C_{3N}$ of the memory table MC for the detailed map TC.

When such storing processing of driving locus data proceeds, if the navigation mode selecting switch SW1 is depressed and the locus display mode is selected, then a plurality of dots indicative of a driving locus are displayed on a map displayed on the screen 26a of the CRT 26.

Thus, if the operator first touches any portion of the screen 26a of the CRT 26, then the menu including the setting patterns of map selection and a current position is displayed on the screen 26a as shown in FIG. 7. Then, whichever one of the setting patterns is touched, setting patterns for enlargement and reduction not shown for the selection of a kind of a map are displayed on the screen 26a after switching at first.

Figure 17A:
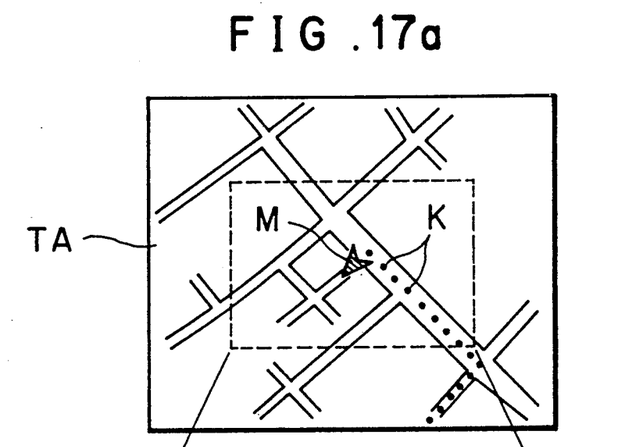
FIGS. 17a to 17c are diagrammatic views illustrating maps and loci displayed on the screen of the display unit of FIG. 2.

Now, if the setting pattern for enlargement is touched, map information is read out from the CD ROM 25a, and a wide area map TA including a current position of the automobile is displayed on the screen 26a as shown in FIG. 17a. Then, locus data are read out from the memory table MA and pattern data are read out from the display RAM 10, and the current position mark M and the driving locus K are displayed on the map TA on the screen 26a. While the driving locus K is displayed in the form of a plurality of serial dots, the distance between them corresponds to the wide area map TA.

Figure 17B:
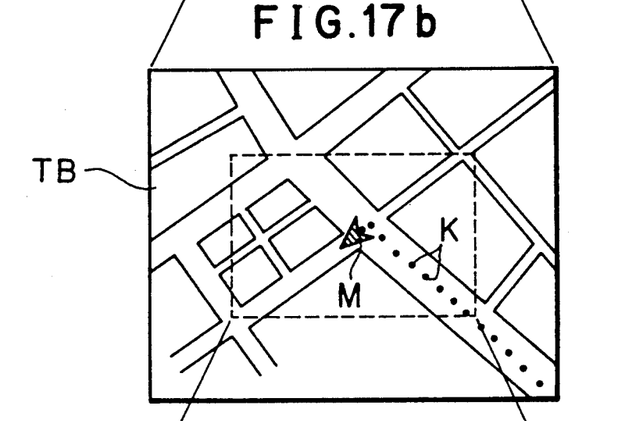

Then, when the map displayed is to be switched from the wide area map TA to a standard map TB during driving of the automobile, the operator will touch the setting pattern for enlargement. Consequently, the map TA is erased, and instead, a standard map TB is now displayed on the screen 26a of the CRT 26 as shown in FIG. 17b. Then, locus data are read out from the memory table MB, and a plurality of dots corresponding to the standard map TB are displayed as a driving locus K on the screen 26a.

Figure 17C:
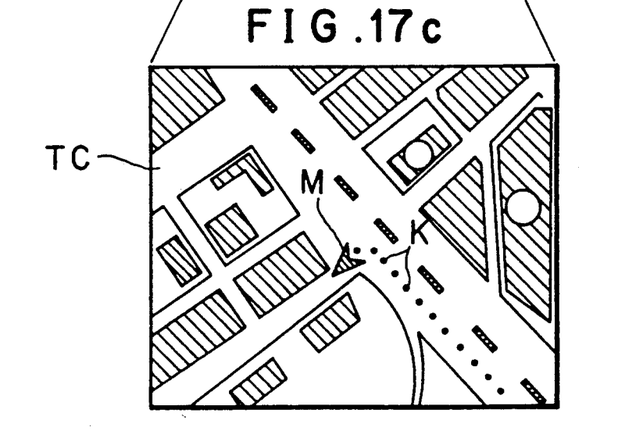

On the other hand, when it is intended to replace the map TB with a detailed map TC, the setting pattern for reduction will be touched. Consequently, the map TB is erased, and instead, a detailed map TC is now displayed on the screen 26a of the CRT 26 as shown in FIG. 17c. Then, locus memory data are read out from the memory table MC, and dots corresponding to the detailed map TC are displayed as a driving locus K on the screen 26a.

Accordingly, when the driver looks at a map displayed on the screen 26a of the CRT 26, while the map may have any of the predetermined scales, since the distance between dots indicating a driving locus K corresponds to the map displayed, the driver can visually discern a driving locus indicated along a line of a road or the like.

It is to be noted that, even if a map displayed on the screen 26a of the CRT 26 is replaced by a next map when a driving locus K displayed on the map comes to a display limit of the screen 26a during driving of the automobile, since locus data are stored differently in the memory tables MA, MB and MC as described above, the driving locus K is displayed automatically on the newly displayed next map.

Further, since the distance between dots on the screen 26a of the CRT 26 corresponds to a set time for the storage of position data, if the speed of the automobile increases, then the distance between dots is increased, but on the contrary if the speed decreases, then the distance is decreased.

As described above, in the present embodiment, position data (x, y) developed from the current position detecting means are stored into the memory tables MA, MB and MC corresponding respectively to the three different maps TA, TB and TC having different scales and are then read out as locus data corresponding to a map to be displayed on the screen 26a of the CRT 26, and the locus data thus read out are displayed as a driving locus K on the map on the screen 26a.

Accordingly, since a driving locus having a dot distance corresponding to a type of a map among a wide area map TA, a standard map TB and a detailed map TC can be displayed, the driver can visually discern the driving locus of the automobile correctly. Further, even if a map displayed is changed over successively between adjacent maps, since locus data are always stored, the driving locus is automatically displayed on the newly displayed next map. Consequently, even if a map displayed is replaced by a next map when the driving locus K reaches a display limit of the screen 26a of the CRT 26, there is no necessity of performing setting of a new starting point on the screen of the next map.

Having now fully described the invention, it will be apparent to one of ordinary skill in the art that many changes and modifications can be made thereto without departing from the spirit and scope of the invention as set forth herein.

What is claimed is:

1. A navigation system for a movable body, comprising:

map storage means in which a map is stored;

current position detecting means for detecting a current position of said movable body with respect to the map;

locus storage means for storing therein a locus of said movable body, said locus provided by successive ones of the current position detected successively by said current position detecting means;

display means having a screen for normally displaying thereon the map from said map storage means, a current position of said movable body from said position detecting means, and a locus of said movable body from said locus storage means; and selectively operable switching means for manually causing said display means to erase the display of only the locus of said movable body;

said selectively operable switching means being a manually operated switch.

2. A navigation system for a movable body as claimed in claim 1, wherein said storage means stores a plurality of maps therein, and further comprising manually operable means for designating one of the maps stored in said storage means to be displayed on said screen of said display means.

3. A navigation system for a movable body as claimed in claim 1, wherein the display continues to display the map and a current position of the movable body when the locus is erased, so that details of the map are not obstructed by the locus.

4. A navigation system for a movable body, comprising:

map storage means in which a plurality of maps including a common region and having different scales are stored;

manually operable means for selecting one of the maps stored in said storage means and to designate a corresponding one of the scales;

current position detecting means for detecting a current position of said movable body with respect to geography of the maps;

a plurality of locus memories provided corresponding to the scales of the maps stored in said map storage means for storing therein current position data received successively from said current position detecting means at respective different predetermined time intervals corresponding to the scales as locus data representative of loci of said movable body with respect to the maps;

display means, having a screen, for displaying thereon a map and a current position and a locus of said movable body; and display controlling means, responsive to the designated scale, for controlling said display means to display thereon the selected map and a locus of said movable body provided by locus data from one of said locus memories corresponding to the designated scale;

said display means displaying said locus of said movable body with dots such that a distance between said dots is maintained equal for each scale of the display, said distance between dots for one scale being equal to said distance between dots for another scale, thereby facilitating observation of an indication by an observer.

* * * * *